(12) United States Patent
Hoeftberger et al.

(10) Patent No.: US 12,235,674 B2
(45) Date of Patent: Feb. 25, 2025

(54) TIME SYNCHRONIZATION BETWEEN A MASTER AND A SLAVE IN A NETWORK

(71) Applicant: B&R INDUSTRIAL AUTOMATION GMBH, Eggelsberg (AT)

(72) Inventors: Oliver Hoeftberger, Eggelsberg (AT); Franz Profelt, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 83 days.

(21) Appl. No.: 18/223,281

(22) Filed: Jul. 18, 2023

(65) Prior Publication Data

US 2024/0028067 A1 Jan. 25, 2024

(30) Foreign Application Priority Data

Jul. 19, 2022 (AT) .............................. A 50540/2022

(51) Int. Cl.
*G06F 1/12* (2006.01)
*G06F 1/14* (2006.01)

(52) U.S. Cl.
CPC . *G06F 1/12* (2013.01); *G06F 1/14* (2013.01)

(58) Field of Classification Search
CPC .................................... G06F 1/12; G06F 1/10
See application file for complete search history.

(56) References Cited

U.S. PATENT DOCUMENTS

| 6,128,318 A * | 10/2000 | Sato ................... H04N 21/4302 |
| | | 709/248 |
| 6,981,063 B1 | 12/2005 | Eggers et al. |
| 7,356,617 B2 | 4/2008 | Suzuki et al. |
| 7,394,830 B2 * | 7/2008 | Chapman ............... H04J 3/0694 |
| | | 713/400 |

(Continued)

FOREIGN PATENT DOCUMENTS

| CN | 111953469 | 11/2020 |
| CN | 111970080 | 11/2020 |

(Continued)

OTHER PUBLICATIONS

Austria Search Report conducted in counterpart Austria Appln. No. A 50540/2022 (Mar. 7, 2023).

(Continued)

*Primary Examiner* — Phil K Nguyen
(74) *Attorney, Agent, or Firm* — GREENBLUM & BERNSTEIN, P.L.C.

(57) ABSTRACT

Method for time synchronization in a network between at least one master and at least one slave, which is an interrupt-capable network component and uses a timer, which accesses a slave time to generate at least one interrupt recurring at a predefined cycle duration, at a respective trigger point in time that is synchronized with the slave time. When a synchronization message arrives, a time offset between the master time and the slave time is determined in the slave, and a time fraction is determined from the time offset, which corresponds to an integer multiple of the (Continued)

predefined cycle duration of the at least one interrupt. An interrupt offset is then determined from the time fraction and the time offset. At least one time jump is carried out by a synchronization unit in the slave to correct the time offset.

4 Claims, 4 Drawing Sheets

(56) References Cited

U.S. PATENT DOCUMENTS

| | | | | |
|---|---|---|---|---|
| 12,105,553 | B2* | 10/2024 | Ahn | G06F 1/163 |
| 2007/0188116 | A1* | 8/2007 | Aoyama | H03L 7/113 |
| | | | | 318/77 |
| 2013/0077642 | A1* | 3/2013 | Webb, III | H04J 3/0661 |
| | | | | 370/503 |
| 2015/0171621 | A1* | 6/2015 | Oda | H02H 7/263 |
| | | | | 361/64 |
| 2016/0134267 | A1* | 5/2016 | Adachi | H03K 5/156 |
| | | | | 327/237 |
| 2020/0007309 | A1* | 1/2020 | Vigier | G01S 13/878 |
| 2021/0328696 | A1* | 10/2021 | Lv | H04J 3/0644 |
| 2022/0150305 | A1 | 5/2022 | Weber et al. | |
| 2024/0298059 | A1* | 9/2024 | Cho | H04N 21/43076 |

FOREIGN PATENT DOCUMENTS

| | | |
|---|---|---|
| EP | 3 996 298 | 5/2022 |
| WO | 00/44194 | 7/2000 |

OTHER PUBLICATIONS

Europe Search Report conducted in counterpart Europe Appln. No. 23185713.7 (Dec. 11, 2023).
Lesi et al., Synchronization of Distributed Controllers in Cyber-Physical Systems, 2019 24$^{th}$ IEEE Int'l Conference on Emerging Tech. and Factory Automation, XP033633653, pp. 710-717 (Sep. 10, 2019).
Aoun et al., Distributed Task Synchronization in Wireless Sensor Networks, 2015 18$^{th}$ Int'l Conference, Austin, TX, [Lecture Notes in Computer Science; Lect. Notes Computer], XP047397617, pp. 150-165 (Feb. 11, 2009).

* cited by examiner

TIME SYNCHRONIZATION BETWEEN A MASTER AND A SLAVE IN A NETWORK

CROSS-REFERENCE TO RELATED APPLICATION

This application claims priority under 35 U.S.C. § 119(a) to Austria Application No. A50540/2022 filed Jul. 19, 2022, the disclosure of which is expressly incorporated by reference herein in its entirety.

BACKGROUND

1. Field of the Invention

Embodiments are directed to a method for time synchronization between at least one master and at least one slave in a network. The at least one master predefines a master time and sends at least one synchronization message with the master time via the network to the at least one slave. The at least one slave, on which a slave time runs, uses the synchronization message to adjust the slave time to the master time using synchronization. The at least one slave is an interrupt-capable network component of the network and uses a timer which accesses the slave time to generate at least one interrupt, which recurs at predefined regular cycle durations, at a respective trigger point in time that is synchronized with the slave time.

2. Discussion of Background Information

In principle, completely different hardware components, such as central processing units, bus modules, drive modules, bus couplers, IO modules having integrated network connections, cameras, HMI devices, network-integrated sensors and actuators, network infrastructure (switches, bridges, etc.) and the like, can be provided as network components of a network. Each network component in a network has at least one clock that is used to control the work processes in the network component itself. For example, this clock can predefine the usable CPU processing time of each computer process. Workflows between network components in the network are also adjusted using the clock. This enables the control of various workflows in which different network components are involved in a network.

In principle, a distinction is made between hardware-based clocks and logical clocks. Hardware-based clocks are, for example, quartz oscillators having counting registers, the quartz oscillator specifying regular oscillations that are then recorded by the counting register. Such hardware-based clocks are dependent on physical variables such as temperature, air pressure, ambient humidity, etc. Therefore, the location of a network component can affect the quartz oscillator, and these changes can result in different clock or frequency rates of a hardware-based clock. While this often has no consequences for an isolated network component, time synchronization between the clocks of different network components that run at different frequencies can become necessary in the network having different network components.

In the case of a logical clock, the clock signal comes from the hardware, such as a hardware-based clock, via an interrupt request. The logical clock must therefore first be set after switching on a network component. A logical clock is a component of a computer system that can be used to give events, such as workflows in a network, a unique time stamp.

A time stamp is used to assign a unique point in time to an event. The accuracy of this time stamp decisively depends on the accuracy of a logic clock. Events are, for example, various physical workflows in a production plant, but they can also be of a digital nature, such as communication between different network components. Movements of machine parts or goods, for example on a machine, or a processing step on a processing machine can take place as physical workflows. The physical workflows can be initiated or executed by network components designed as actuators and recorded by network components designed as sensors. In the event of a production failure, for example, it is possible to tell exactly based on the time stamp which component of a machine was responsible for a failure and at what point in time. This significantly simplifies troubleshooting in highly complex production systems.

A clock of a network component can be configured both as a hardware-based clock and a logical clock or a combination thereof. For example, two logical clocks can use the same hardware-based clock. At least one hardware-based clock is usually installed in a network component, the clock in each case indicating at least a time in the network component. As a rule, such a time continues to count continuously from a first initialization, for example in predefined fractions of a second. In such a clock, the quartz oscillator acts as a clock generator. To ensure that this clock does not stop when the device is switched off, the clock can be constantly supplied with energy from a power source, i.e., a battery or a rechargeable battery. In the event of a loss of power, for example if the button battery on the motherboard is dead, this clock would then start counting again when a new power source is used.

For example, a logical clock now uses the hardware-based clock mentioned above to control workflows and give events a time stamp.

Unavoidable inaccuracies can occur in a network, for example because the built-in quartz oscillators do not oscillate at exactly the same frequency due to manufacturing inaccuracies. Furthermore, different locations of the network components can cause the frequency difference in the quartz oscillators to arise or increase due to external influences. Network components can be located together in a machine hall, or they can also be spatially separated from each other. For example, temperature differences caused by different outside temperatures, air conditioning and CPU heating can have an impact on the quartz oscillator.

In order to enable a time-controlled communication via various network components or to be able to carry out other time-coordinated activities, it is necessary to synchronize the clocks in different network components, in different domains of networks or in different networks that have a different time with one another. In the simplest case, one network component in the network is designated as a master and the other network components are designated as slaves. A network component that is a master can be a particularly powerful and fail-safe network component. The master then predefines a time for the slaves in the network and uses it to regulate the time synchronization. As a rule, there are a plurality of masters in a network. It may also be possible for the master roles to change periodically between network components, for example in the event of a failure of a network component that acts as a master, or in the event of a failure of the connection between different parts of networks.

It may also be that different networks synchronize with one another in terms of time. There is then a master for the time synchronization within each network. A master of a second network acts as a slave of the master of a first network during the time synchronization between the networks. The master of the second network acting as a slave is then synchronized with the master of the first network. This master of the second network can then synchronize all slaves of the second network. A network hierarchy can also be established for this purpose, according to which the order in which the individual networks synchronize with one another is established. Thus, the master of the second network can predefine a dedicated time in the second network, which is being adjusted, for example, with a master time of the first network by way of time synchronization. For example, a network component can act as a master in a network as long as the network component does not receive a time synchronization of a master of a hierarchically overlying network. It is conceivable, for example, that a network in a machine, which can run alone and itself contains network components, i.e., at least one master and one slave, first carries out a time synchronization internally. When this machine is integrated into production, it may then be necessary for the network of the machine to be synchronized with a hierarchically higher network, for example a network of the production system. It is also conceivable for different domains of a network to be synchronized by a master.

However, there is often not just one master for a clock in a network, but rather a plurality of masters, referred to as "standby masters." As long as the original master carries out the time synchronization with respect to a clock, the standby masters behave like slaves. If the first master fails, one of the standby masters can take over and carry out the time synchronization.

Furthermore, with regard to other tasks, masters for the time synchronization can only be simple slaves. In the present invention, the terms "master" and "slave" relate exclusively to the time synchronization in a network and not to other functionalities, such as in a production process. However, both master and slaves are network components in a network.

As a rule, the clocks in a network are adjusted by way of synchronization. A complete adaptation of the time is carried out between the master and slave. The slave adjusts both the frequency and the time difference. The time difference shall be understood to mean the specific difference between the clock of the master and the clock of the slave. For example, a master has a time of 1:02 p.m. and a slave has a time of 1:05 p.m. The time of the slave is now set from 1:05 p.m. to 1:02 p.m., and the slave, based on the knowledge of the time in the master, for example based on synchronization messages from the master to the slave, adjusts the frequency so that the clocks run at the same speed. Precise adjustment of the frequencies can only be possible after a certain number of synchronization messages.

To avoid time jumps, whenever possible, the frequency of the slave can be accelerated or decelerated so that the clocks in the master and slave are synchronized. However, this process can take a long time if there are large deviations between the master and slave and can lead to persistent errors, especially in the frequency.

Solely adjusting the frequencies can be carried out by way of syntonization. Syntonization shall be understood to mean the adaptation of the frequency between a master and a slave in a network, without any adjustment of a time difference, as used in the case of synchronization. As in the example above, the times would not be corrected to the time of the master using a jump, but the times would continue to run with the same difference. This at least prevents the difference from becoming greater when both clocks have the same frequency. In addition, jumps in the clock are prevented in this way, for example. Furthermore, the time in the network components would also pass at the same pace, as a result of which locally measured time periods become comparable.

The current prior art for time synchronization is the IEEE's Precision Time Protocol (PTP) standard (IEEE 1588). This standard provides that each clock in a network component is synchronized separately with a master via the network. For example, a clock can be synchronized with other clocks in the network based on the standard.

Synchronized applications, such as high-precision work or production processes, are controlled via at least one timer in a network component. A timer controls cyclic processes in a system by issuing an interrupt request at regular intervals (cycle duration). With each interrupt, a cyclically recurring process (essentially a piece of program code running in the network component) is carried out. This can be important, for example, for current and future events, such as a step in a production process, which are to trigger at a predefined interrupt of the timer. A timer can trigger an interrupt every 100 microseconds ($\mu$s), for example, or also at longer or shorter time intervals. A timer is usually configured to trigger the desired or required interrupts. The timer can also be designed to trigger interrupts at different predefined points in time.

When a production process is started, a predefined time can generally be allowed to elapse until the clocks of all network components are synchronized and the cycle duration of all interrupts has also adjusted, since during starting, due to inaccuracies of the oscillating crystals, the cycle duration of the individual interrupts in the network components can have different frequencies, for example. It is also possible for a network component to output several different interrupts. This is possible, for example, if several processes access a network component, or the network component has to control several processes. Interrupts can then also have different cycle durations, for example 200 $\mu$s and 1000 $\mu$s.

However, a loss of the connection during an ongoing process may lead to problems in the time synchronization. A lost connection can occur, for example, unintentionally, via a loss of connectivity, for example disconnection of a cable or failure of a switch, modem or router, or loss of a GPS connection of a vehicle when entering a tunnel. Network components or entire hierarchically subordinate networks can then continue to operate system-internally, but can also switch into a shut-off or standby mode, shut down or, if no cutout switch is present, can also crash. When the network component is restarted or when the connection is re-established, the time synchronization can be lost until a subsequent synchronization message. It is also possible, and also likely, that interrupts then no longer run correctly.

However, there may also be desired interruptions in the connection, for example in the case of autonomously driving vehicles, which are disconnected from their base station over a certain period of time.

It can then happen that the cycle duration of the interrupts between the different network components diverges. In the prior art, the time between the slave and the master is adapted again by using a single synchronization step. As a result, the actual cycle duration of the interrupt at the time of the synchronization message can in particular be shortened or also be extended.

Consequently, this can lead to problems in the temporal sequence and stability of high-precision workflows, in which several network components can be involved.

SUMMARY

Embodiments are directed to providing time synchronization that prevents the interruptions of workflows.

In embodiments, when a synchronization message arrives, a time offset between the master time and the slave time is determined in the slave or in the interrupt-capable network component, which acts as a slave. A time fraction is then determined from the time offset, which corresponds to an integer multiple of the predefined cycle duration of the at least one interrupt, and an interrupt offset is then derived from the time fraction and the time offset, e.g., as a difference. To correct the determined time offset between the master time and the slave time, at least one time jump is then carried out in the slave or in the interrupt-capable network component acting as a slave. A first trigger point in time of the at least one interrupt following the at least one time jump is then set in such a way that this is offset by the predefined cycle duration in relation to the last trigger point in time before the at least one time jump. Furthermore, a number of trigger points in time of the at least one interrupt which follow the at least one time jump is temporally shifted by an adaptation duration, wherein the adaptation duration for each of the number of the trigger points in time following the at least one time jump is selected from a time range in such a way that the adaptation duration corresponds at most to the interrupt offset and at most to a predefined temporal deviation, and that the sum of all adaptation durations for the number of the trigger points in time following the at least one time jump corresponds to the interrupt offset, taking a predefined tolerance value into consideration (e.g., plus/minus the predefined tolerance value).

The main aspect of the invention is that first, in a first synchronization step, the time offset, and thus a very large time difference between the master and the slave in the network, is corrected by at least one time jump, without an operation of the production or ongoing work processes, and in particular real-time capable applications, being disturbed in their flow, since the interrupts usually have a higher frequency than the reception of the synchronization messages. In the further course of the method, the trigger point in time of the at least one recurring interrupt is then adapted until an interrupt offset, which results after the at least one time jump, compared to the other interrupt-capable network components is corrected. The adaptation duration is selected so as not to exceed the interrupt offset and so that the predefined cycle duration of the at least one interrupt is not increased or shortened too much. This ensures that an actual cycle duration of the at least one interrupt after the at least one time jump or during the adaptation to the other network components is only insignificantly shortened or extended compared to the predefined cycle duration. In particular high-precision workflows and/or real-time capable applications in a network, such as a plant, a machine, etc. are therefore not jeopardized, since, for example, program codes are executed fully or, for example, control parameters are not calculated incorrectly.

It is advantageous in the process if the interrupt-capable network component is configured as a further network with a further master. The at least one master of the network predefines the master time to the further master of the further network. It is possible in this way to carry out the time synchronization in a very simple and efficient manner in two or more networks. For example, each network can carry out a time synchronization autonomously and then, for example, the further network can be synchronized very easily with the network. As a result, for example, plants with multiple connected networks can be started up or, for example, a further network can be added to an existing network and synchronized with the network.

In embodiments, a network includes a plurality of network components, wherein, with respect to a time synchronization, at least one network component is a master and at least one further network component is a slave. The master or the network component acting as the master has a master time and is designed to send at least one synchronization message to the at least one slave or to the at least one further network component acting as the slave, which has a slave time. The at least one slave is furthermore designed to synchronize the slave time with the master time using time synchronization. Furthermore, at least one network component, in particular the network component acting as the slave, is designed as an interrupt-capable network component and has a timer, which accesses the slave time to generate at least one interrupt, which recurs at a predefined cycle duration, at a respective trigger point in time that is synchronized with the slave time. Furthermore, the interrupt-capable network component has a synchronization unit, which is designed to carry out the following:

- determining a time offset between the master time and the slave time when a synchronization message arrives;
- determining a time fraction of the time offset, wherein the time fraction corresponds to an integer multiple of the predefined cycle duration of the at least one interrupt;
- determining an interrupt offset from the time fraction and the time offset;
- carrying out at least one time jump to correct the time offset between the master time and the slave time;
- setting a first trigger point in time of the at least one interrupt following the at least one time jump in such a way that the first trigger point in time following the at least one time jump is offset by the predefined cycle duration in relation to the last trigger point in time prior to the at least one time jump; and
- temporally shifting a number of trigger points in time of the at least one interrupt which follow the at least one time jump by an adaptation duration, wherein the adaptation duration for each trigger point in time of the number of the trigger points in time following the at least one time jump is selected in such a way that the adaptation duration corresponds at most to the interrupt offset and at most to a predefined temporal deviation, and that the sum of all adaptation durations for the number of the trigger points in time following the at least one time jump corresponds to the interrupt offset, taking a predefined tolerance value into consideration.

Ideally, the interrupt-capable network component is configured as a further network with a further master. The at least one master of the network can predefine the master time to the further master of the further network. In this way, two or more networks can be synchronized, for example in plants, or after adding a network. Ideally, a network hierarchy is established for the temporal synchronization, which predefines which network or which master assumes a superordinate role, and which network or which master assumes a subordinate role.

Other exemplary embodiments and advantages of the present invention may be ascertained by reviewing the present disclosure and the accompanying drawing.

BRIEF DESCRIPTION OF THE DRAWINGS

The present invention is described in greater detail hereafter with reference to FIGS. 1 to 5, which show by way of example schematic and non-limiting advantageous embodiments of the invention. In the figures.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
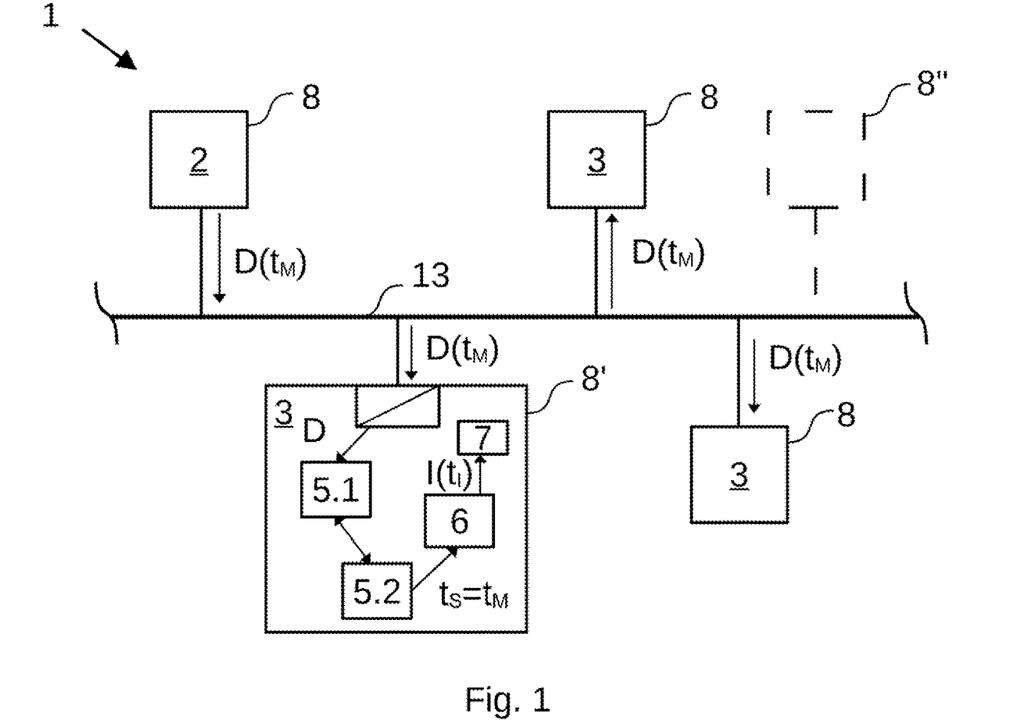
FIG. 1 shows a network according to the invention with a master and slaves.

FIG. 1 shows an exemplary network 1 with multiple network components 8, 8', 8", wherein at least one master 2 and multiple slaves 3 are present with respect to a time synchronization. The network components 8, 8', 8" are connected to one another via network lines 13. The network lines 13 often form a data bus for data communication between the network components 8, 8', 8", as is also shown in FIG. 1. The network lines 13 can be LAN cables, network buses, fiber optic cables and the like, which allow communication in the network 1 between the network components 8, 8', 8". Any communication protocol can be implemented for data communication. A network infrastructure can also be provided, which connects different networks 1 or different portions of a network 1 to one another, for example switches, routers, etc. Wireless data traffic having time synchronization over a wireless network, such as wireless LAN (WLAN), is also conceivable in a network 1 or in parts of a network 1. In this case, the network line 13 is a wireless connection between network components 8, 8', 8". The network 1 may also be embodied as a mixed wired and wireless network 1. All network topologies that are familiar to a person skilled in the art and enable data transfer with time synchronization between the network components 8, 8', 8" are conceivable for the network 1.

A plurality of different network components 8, 8', 8', such as processing units, bus modules, drive modules, bus couplers, IO modules having integrated network connection, cameras, HMI devices, network-integrated sensors and actuators, etc., can be present In a network topology of the network 1. A network component 8, 8', 8" usually has a microprocessor 7 on which stored program code is executed in order to implement a certain intended functionality of the network component 8, 8', 8". For this purpose, an operating system can also be installed and run on a network component 8, 8', 8", wherein a wide variety of operating systems, such as iOS, Linux/Unix, Windows, Android and the like, can run on different network components 8, 8', 8".

At least one interrupt-capable network component 8' is present in the network 1, which also has a timer 6, in addition to a clock 5.2. The timer 6 is provided to generate at least one interrupt I at predefined trigger points in time $t_I$, as shown in FIG. 1. For example, the timer 6 can trigger an interrupt I at a predefined interval, as a function of a cycle duration $t_C$. The interrupt I is preferably processed in the microprocessor 7, for example in order to control the sequence of a program code. The timer 6 accesses the time of a clock 5.2 in the interrupt-capable network component 8' for this purpose. Since the interrupt-capable network component 8' is a slave 3 with respect to the time synchronization, the time of the clock 5.2 depends on the master time $t_M$ of the master 2 (network component 8), and thus is a slave time $t_S$. Consequently, the timer 6 of the network component 8' or of the slave 3 uses the slave time $t_S$ to generate the interrupt I at the trigger points in time $t_I$.

However, there may also be further interrupt-capable network components 8' in the network 1, as indicated by dashed lines in FIG. 1.

A slave time $t_S$ not yet synchronized with respect to the master time $t_M$ can be different with respect to the absolute time and the frequency. For example, the slave time $t_S$ can differ from the master time $t_M$ by a certain period of time, such as several years, weeks, days, hours, etc., but have the same frequency. Thus, for example, the absolute time would not be identical. The slave time $t_S$ in the slave 3, for example, can have the year 2019, while the master time $t_M$ in the master 2 has the year 2021. The master time $t_M$ and the slave time $t_S$, however, would elapse at an equal pace. At the same frequency, the nominal duration, for example, of one second is the same, i.e., the seconds elapse equally quickly in the master 2 and in the slave 3. However, it is also possible, and often likely, that neither the absolute time nor the frequency are the same between the master 2 and the slave 3 prior to synchronization. Therefore, at different frequencies between the slave 3 and the master 2, a cycle duration $t_C$ of an interrupt I in the master 2 and in the slave 3, or even in the case of different slaves 3, can be the same nominally, but actually be different. The measured cycle durations $t_C$ of the interrupt I in the master 2, in the slave 3 or in different slaves 3 can therefore differ from one another. Different cycle durations $t_C$ of interrupts I can lead to problems in high-precision production processes in which various network components 8, 8', 8" are involved since then, for example, the program codes controlled thereby do not run in a sufficiently synchronized manner.

The master 2 usually sends a synchronization message D to the slaves 3 in the network 1. The synchronization message D contains the current master time $t_M$. For example, the synchronization message D can be received via a network port of the slave 3. The contained master time $t_M$ is processed in the slave 3 in a synchronization unit 5.1. The synchronization unit 5.1 can also be implemented in the microprocessor 7 for this purpose, wherein the synchronization unit 5.1 can be software-based and/or hardware-based and executes a program code or a hardware circuit. The synchronization unit 5.1 predefines a current slave time is for the clock 5.2, which is adjusted to a master time $t_M$ from the synchronization message D. The synchronization unit 5.1 can also be integrated in the clock 5.2. The synchronization messages D can arrive at different slaves 3 at different times. This can depend on the position of the particular slave 3 in the network 1, on the network topology and on the run time of the synchronization message D.

The synchronization unit 5.1, which in the usual implementation is essentially a corresponding program code running in the slave 3, for example a synchronization stack 10 (see FIG. 4), compares its own current slave time $t_S$ to the master time $t_M$ from the synchronization message D. The run time of the synchronization message D in the network 1 is preferably known and is taken into consideration by the synchronization unit 5.1 during the time synchronization.

The synchronization unit 5.1 synchronizes the absolute time and the frequency of the clock 5.2 of the slave 3 to the master 2 so that, after the synchronization, the slave time $t_S$ corresponds to the master time $t_M$, as shown in FIG. 1, and so that the frequency in the slave 3 also corresponds to the frequency in the master 2. The frequency, for example, can be calculated with precision from the calculated time difference of several successive synchronization messages D.

The interrupts I generated by the timer 6 in the slave 3 can be of the same nominal cycle duration $t_C$; however, it is also possible for the cycle durations kc to differ according to a certain, known scheme. There may also be several interrupts I having different nominal cycle durations $t_C$ in a single interrupt-capable network component 8', 8". The cycle durations $t_C$ themselves can be predefined by the particular application, i.e., for example, by a software (stack) or an application for controlling a machine, in the network component 8', 8" and are normally independent of the synchronization. However, it is also possible for the cycle durations $t_C$ to be set by a user, or to have been predefined in firmware by a manufacturer.

As will be explained below, however, it will occur in the method according to the invention that the trigger points in time $t_I$ of the interrupts I have to be reset so that the predefined cycle durations $t_C$ can be adhered to. It can also be the goal that the interrupts I have been and remain coordinated with one another in various interrupt-capable network components 8', 8". In this case, the synchronization unit 5.1 can (directly or indirectly) predefine the extent to which trigger points in time $t_I$ of the interrupts I have to be changed.

To provide an easier understanding of the invention, different cycle durations $t_C$ are dispensed with in the following embodiments, without limiting the general nature, and all cycle durations $t_C$ correspond to the nominal cycle duration $t_C$ of the interrupt I(2) of the master 2, which can also be an interrupt-capable network component 8', 8". Furthermore, it is assumed that all slaves 3 receive the synchronization messages D at the same time.

Figure 2:
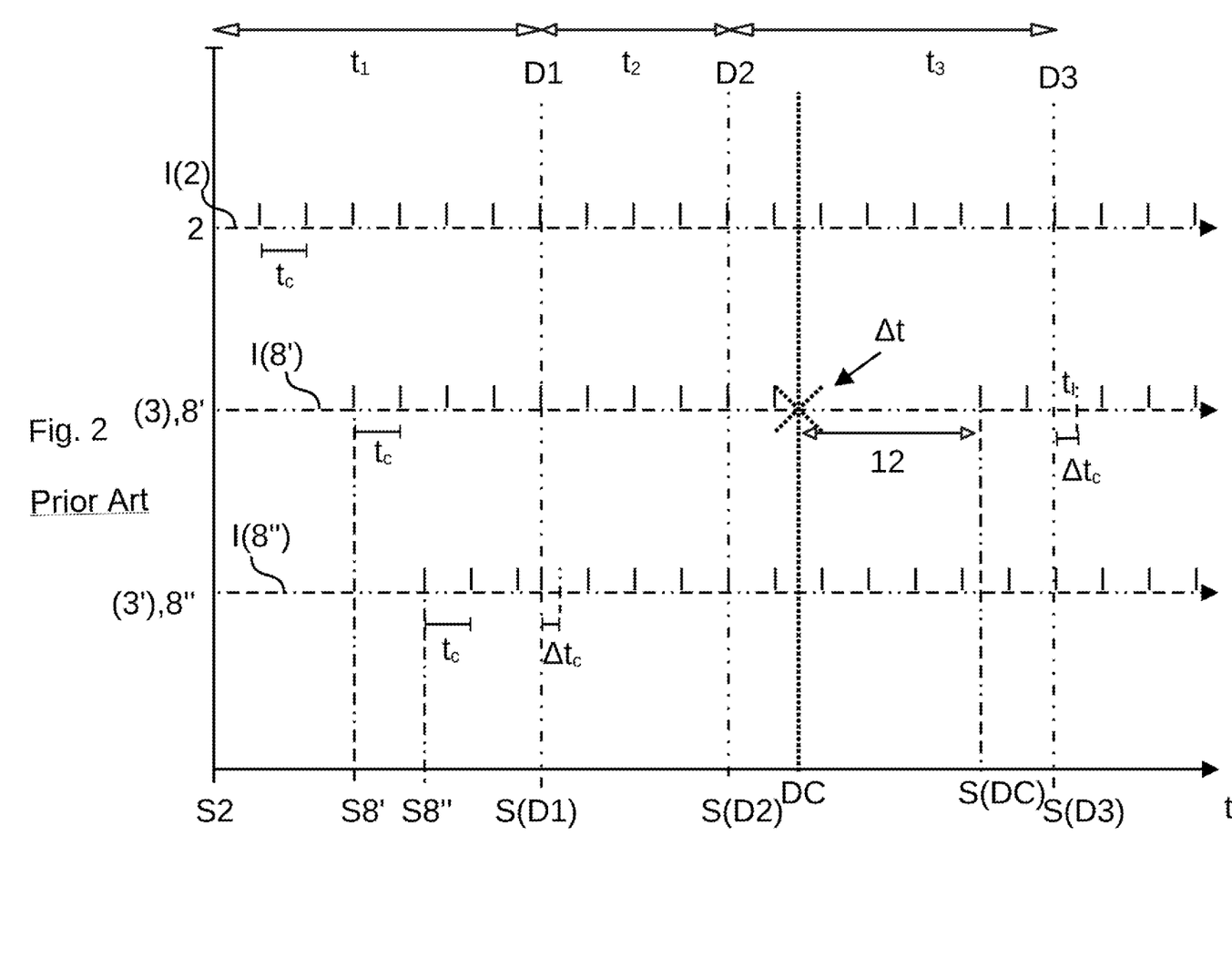
FIG. 2 shows the effects of time synchronization from the prior art on different interrupts in different network components.

The synchronization and the effects thereof on an interrupt I according to the prior art are shown in FIG. 2. The abscissa describes a system time t, and the ordinate corresponds to the different interrupts I(2), I(8'), I(8") of the network components 8, 8', 8" in the network 1 as time bars. The master 2 has an interrupt I(2) with, for example, a cycle duration $t_C$ of 1 millisecond (ms). Furthermore, a slave 3 is present as an interrupt-capable network component 8' having an interrupt I(8'), and a further slave 3' is present as a further interrupt-capable network component 8" having an interrupt I (8"). Nominally, the interrupts I (8'), I(8") have the same cycle duration $t_C$ as the interrupt I(2) of the master 2. However, a real cycle duration $t_{C,R}$ in the respective network component 8', 8" can differ due to different frequencies of the clocks 5.2 in the interrupt-capable network components 8', 8" (slaves 3) and also relative to the master 2. For example, the actual cycle duration $t_{C,R}$ of the interrupt-capable network component 8' can be 1020 μs, while the real cycle duration $t_{C,R}$ of the further interrupt-capable network component 8" can be 980 μs. The triggering of the various interrupts I(2), I(8'), I(8") by the timer 6 can also generally take place at different trigger points in time $t_I$. The different Interrupts I(2), I(8'), I(8') can thus diverge and, for example, no longer be coordinated with one another.

The points in time S2, S8', S8" of the interrupts I(2), I(8'), I(8") can be different, for example when booting a PC, initializing a production machine, etc., given in the time range t1. After a certain period of time, the master 2 sends the first synchronization message D1 via the network 1 to the slaves 3, 3'. As described above, the clocks 5.2 in the slaves 3, 3' are synchronized via the first synchronization message D1. The slave times $t_S$ in the slaves 3, 3' are synchronized using a time jump to the master time $t_M$.

In the described exemplary embodiment, it is assumed that all interrupts I(2), I(8'), I(8") are to run synchronously at the point in time S(D1). However, this is not always necessarily the case. The time jump of the clocks 5.2 at the point in time S(D1), for example, causes the interrupt I (8") to be shortened and to have an interrupt (I(8") that is temporally shortened by an interrupt offset $\Delta t_C$. During booting or during the initialization, a single time jump, which fully adjusts the absolute time in the slave 3, such as at the point in time S(D1), can be unproblematic since shortening of the interrupt I(8') does not have any impact yet. Thus, for example, in the case of an interrupt I(8'), I(8") that has a length of a nominal cycle duration $t_C$ of 1000 μs, only 600 μs may have elapsed during the time jump. As a result of the time jump, this interrupt I(8'), I(8") loses 400 μs, i.e., the interrupt offset $\Delta t_C$, and starts to run again. A timer 6 thus triggers the interrupt I(8"), as shown by way of example in FIG. 2, that is to say at the point in time S(D1), and the current interrupt (8") is shortened by 400 μs. The interrupt of the master I(2) generally does not carry out any time jump. In the case of a change of the master 2, however, it may again be quite possible for the interrupt I(2) of the previous master 2 to carry out time jumps again as the slave 3.

In the time range t2, between the first synchronization message D1 and a subsequent second synchronization message D2, the interrupts I(2), I(8'), I(8") continue to run unchanged and synchronously with one another in the desired manner. The length of the time between the successive synchronization messages D1 and D2 is not necessarily the same. The time range t2 can furthermore extend over a large number of synchronization messages D and represents the desired operating mode.

In the time range t3, that is to say, for example, already during the operation of a production system, that is to say while production processes are ongoing and control tasks are being carried out, an interruption can take place at a point in time DC, and in the case of an interrupt-capable network component 8', by way of example, can lead to an interruption. As explained above, this can have been caused by a mechanical cutting of a cable, a problem in the slave 3 or the like. The interrupt-capable network component 8' (slave 3), which is already running, can go into standby mode, start an error correction or similar operations. Upon an interruption at the point in time DC, the interrupt-capable network component 8' loses the time synchronization with the master 2. This failure 12 is indicated in FIG. 2. After the interruption has been corrected, for example after a restart of the network component 8', the interrupt I(8') can start at a different point in time, for example at the point in time S(DC). However, it is also possible that the interrupt I(8') continues to run and, for example, that no restart of the network component 8' takes place, so that the latter can continue to fulfill its tasks.

The interruption caused a time offset $\Delta t$ between the master time $t_M$ and the slave time $t_S$. This time offset $\Delta t$ can correspond to the time period of the failure 12, but may also be any time period (depending on how the slave 3 continues to operate). This time offset Δt remains until a third synchronization message D3 arrives. The trigger points in time $t_I$ of the interrupts I(8") are thus no longer synchronous with the other network components 8, 8", and an interrupt offset $\Delta t_C$ with respect to these may arise. The time offset Δt can correspond to the interrupt offset $\Delta t_C$. However, it is often the case that the time offset Δt is greater by a multiple of the interrupt offset $\Delta t_C$. The interrupt offset $\Delta t_C$ is corrected at the point in time S(D3), at which the next synchronization message D3 arrives, similarly to the point in time S(D1), with a single time jump, and the interrupt I(8') is thus shortened by the interrupt offset $\Delta t_C$ at this point, but then runs synchronously with the master 2 again.

For example, at the point in time S(D3), the master 2 has an actual cycle duration $t_C$ of 1000 μs of the interrupt I(2), while only an actual cycle duration $t_{C,R}$ of 500 μs of the interrupt I(8') has elapsed in the interrupt-capable network component 8' (even though the cycle duration $t_C$ is also 1000 μs long nominally). During the time synchronization using the synchronization message D3, the missing 500 μs of the interrupt I(8), the interrupt offset $\Delta t_C$ of the interrupt-capable network component 8', is skipped during the time jump and results in an actual cycle duration $t_{C,R}$ the interrupt I(8') that is shortened by an interrupt offset $\Delta t_C$. The next trigger point in time $t_I$ of the interrupt I(8') is then set to the point in time of the time jump in response to the synchronization message D3 at the point in time S(D3). The following trigger points in time $t_I$ of the interrupt I(8') then result from the cycle duration $t_C$ of the interrupt I(8').

For example, the time offset Δt can be 3500 μs between the master time $t_M$ and the slave time $t_S$, which, however, only corresponds, as described above, to an interrupt offset $\Delta t_C$ of 500 μs. This can lead to problems during high-precision work or production processes since the timer 6 triggers the next interrupt I(8') too early, for example. Even though the skipping is unproblematic during the initialization in the time range t1, this can lead to problems during operation since, for example, a certain program code cannot be executed completely or control parameters, such as the determination of a speed, are incorrectly calculated at defined times. Consequently, it may be necessary to interrupt a workflow in the network 1 in order to restore a correct flow of the interrupts I(8'), also of other involved network components 8, 8", following a loss of the time synchronization of a network component 8'.

In the best case, such interruptions can cause a loss of time in production, or in the worst case, it can cause damage to machines or other parts.

Figure 3:
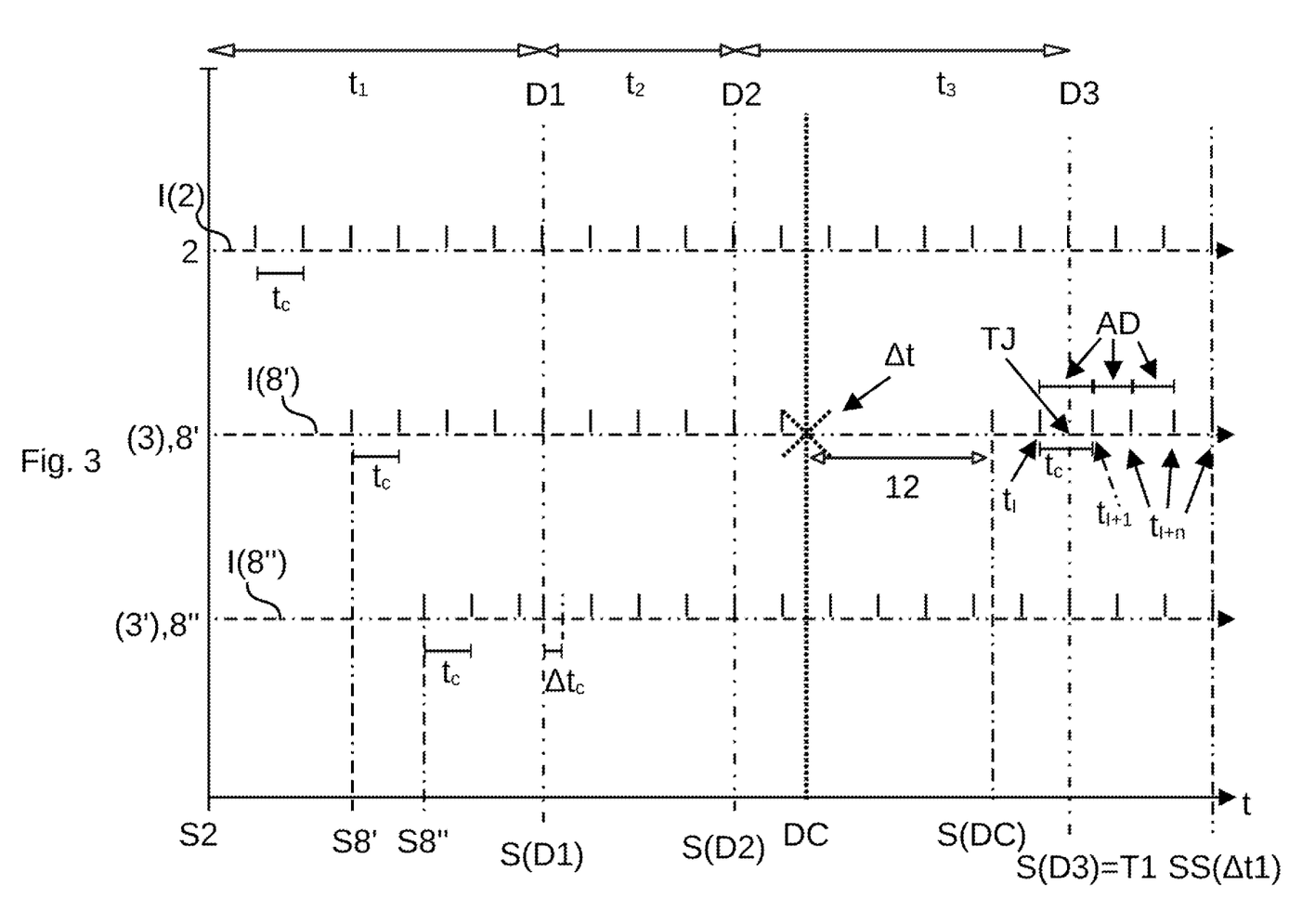
FIG. 3 shows time synchronization according to the invention and the effects thereof on different interrupts.

A synchronization according to the invention is illustrated in FIG. 3. The time range t1 and time range t2 substantially correspond to those of FIG. 2 and will not be described again. However, it can also be provided that no time jumps of the interrupts I(2), I(8'), I(8") are to take place after the interrupts I(2), I(8'), I(8") have started, and therefore no shortening of the interrupts I(2), I(8'). I(8") occurs in a time range t1. In an advantageous embodiment, no time jumps of the interrupts I(2), I(8'), I(8") which shorten the cycle duration $t_C$ of the interrupts I(2), I(8'), I(8"), as described above, thus occur as soon as an application is started that uses the interrupts I(2), I(8'), I(8").

In the time range t3 of FIG. 3, a loss of the time synchronization occurs in the interrupt-capable network component 8' at the point in time DC. The interrupt I(8') in the interrupt-capable network component 8' begins to run again either after the interruption of the time synchronization, that is to say after a failure 12, has been corrected or can simply continue even during the interruption of the time synchronization by the failure 12. By interrupting the time synchronization, however, the slave time $t_S$ in the network component 8', for example, will not be corrected for a certain time period (until the next synchronization message D3 arrives). The interrupt I(8') is now triggered at a trigger point in time $t_I$, which differs from the other interrupts I(2), I(8") of the other network components 8, 8". The trigger point in time $t_I$ of the interrupt I(8') is thus temporally offset by an interrupt offset $\Delta t_C$, as will be explained in more detail below. Furthermore, the slave time $t_S$ may be subject to drift, for example. As a result, the interrupt I(8') is further temporally offset compared to the other interrupts I(2), I(8").

At the point in time S(D3), the interrupt-capable network component 8' (as well as the other present slave 3' or network component 8') receives a synchronization message D3 with the master time $t_M$. Depending on the failure 12, the synchronization unit 5.1 can now establish a time offset Δt in the absolute time in the interrupt-capable network component 8' with respect to the master 2. A difference in the frequency can also occur. According to the invention, a time fraction $\Delta t_I$ of the time offset Δt of the slave time $t_S$ relative to the master time $t_M$ is then determined, wherein the time fraction $\Delta t_I$ of the time offset Δt of the slave time $t_S$ corresponds to an integer multiple of the cycle duration $t_C$ of the at least one interrupt I of the interrupt-capable network component 8' serving as the slave 3. The interrupt offset $\Delta t_C$ can thus be determined as the difference between the time offset Δt and the determined time fraction $\Delta t_I$. This can take place, for example, by traditional subtraction or by using a residual value calculation.

According to the invention, in a first step, the entire time offset Δt is corrected by the synchronization unit 5.2 in at least one time jump TJ, as is also indicated in FIG. 3. In this way, the time offset Δt between the master time $t_M$ and the slave time $t_S$ can preferably be corrected in a single time jump TJ. However, it is also possible, of course, for several time jumps TJ to be used.

Any deviation between the frequency in the master 2 and in the slave 3 or the network component 8; can likewise be corrected in the process.

As is described in the prior art, as explained with reference to FIG. 2, a shortened interrupt I(8') of the interrupt-capable network component 8' would result from the time jump TJ and lead to the problems described above. The method according to the invention prevents this shortened interrupt I as will be explained as follows.

In order to avoid a shortening of the interrupt I(8') in the interrupt-capable network component 8', a first trigger point in time $t_{I+1}$ of the at least one interrupt I(8') following the time jump TJ is set in such a way that this trigger point in time $t_I$ after the time jump TJ is offset by the cycle duration $t_C$ compared to the last trigger point in time $t_I$ prior to the time jump TJ. In contrast to the prior art shown in FIG. 2, the trigger point in time $t_{I+1}$ of the interrupt I(8') is thus not set to the point in time S(D3) of the synchronization message D3. The following trigger points in time $t_{I+1}$ would then again be temporally offset by the cycle duration $t_C$. The trigger points in time $t_{I+1}$, $t_{I+a}$, however, would thus not be synchronous with the interrupts I(2), I(8") in the other network components 8, 8".

It is therefore provided to adapt a number N of trigger points in time $t_{I+1}$, $t_{I+n}$ following the time jump TJ by an adaptation duration AD in order to synchronize the interrupts I(2), I(8') in this way. For this purpose, at least one following trigger point in time $t_{I+n}$ with an Index n, which can take on the values 1 to N, is time-shifted by an adaptation duration AD. The number N of the trigger points in time $t_{I+n}$ following the time jump TJ can thus also encompass the first trigger point in time $t_{I+n}$, that directly follows the time jump TJ. If necessary, the number N can only encompass the first trigger point in time $t_{I+1}$ that follows the time jump TJ. Consequently, after the time jump TJ, the interrupts I(8') continue to run asynchronously with respect to the other interrupt-capable network components 8, 8", but remain approximately equidistant in the interrupt-capable network component 8'. This adaptation of the trigger points in time $t_{I+n}$ by the adaptation duration AD takes place until the interrupt offset $\Delta t_C$ resulting after the time jump TJ has been corrected, and thus the interrupts I(2), I(8'), I(8") run synchronously again in the network components 8, 8', 8". The cycle durations $t_C$ of the interrupts I(8') following the time jump TJ thus do not necessarily have the same length until the interrupt offset $\Delta t_C$ has been corrected.

The adaptation duration AD for the at least one following trigger point in time $t_{I+n}$ is selected from a time range ranging from a value 0 to a value that corresponds to the interrupt offset $\Delta t_C$—i.e., the adaptation duration AD thus corresponds at most to the interrupt offset $\Delta t_C$. The adaptation duration AD furthermore corresponds at most to a predefined temporal deviation dt. With the predefined temporal deviation dt, it is ensured that the cycle duration $t_C$ of one of the following trigger points in time $t_{I+n}$ is not extended or shortened too much in terms of time after a time jump TJ. The temporal deviation dt is suitably selected and can also be dependent on the application in which the network 1 is operated. To ensure that the adaptation durations AD also corrected the interrupt offset $\Delta t_C$, it is furthermore provided that the sum of all adaptation durations AD for the number N of successive trigger points in time $t_{I+n}$ after the time jump TJ corresponds to the interrupt offset $\Delta t_C$, taking (e.g., plus/minus) a predefined tolerance value G into consideration. On account of these conditions and specifications, the number N of the following trigger points in time $t_{I+n}$ also materializes with a resulting interrupt offset $\Delta t_C$ This ensures that, with an index n=N trigger points in time $t_{I+n}$ after the time jump TJ, the interrupt I(8') in the network component 8' is adjusted to the interrupts I(2), I(8") in the other network components 8, 8", and in the process a maximum temporal deviation equal to the predefined tolerance value G remains, which can be selected to be sufficiently small. Ideally, the tolerance value G=0.

The adaptation durations AD for each of the trigger points in time $t_{I+n}$ of the number N do not have to be identical, but each adaptation duration AD must correspond to the aforementioned criteria and specifications.

In certain cases, the interrupt offset $\Delta t_C$ can thus already be corrected at the first (n=1) trigger point in time $t_{I+1}$ following the time jump TJ. However, usually a plurality of trigger points in time $t_{I+n}$ following the time jump TJ are required.

Depending on the magnitude of the interrupt offset $\Delta t_C$, it may be possible, for example, to adjust the interrupt I(8') at only a single subsequent trigger point in time $t_{I+n}$ corrected over the adaptation duration AD, adhering to the predefined temporal deviation dt. However, it may, of course, also be necessary to carry out such an adaptation over a plurality of subsequent trigger points in time $t_{I+n}$.

For example, a cycle duration $t_C$ can, as in the example above in FIG. 3, be 1000 µs, and the time offset $\Delta t$ of the slave time $t_S$ from the master time $t_M$ can be 100, 300 µs. At the point in time S(D3) in FIG. 3, the integer multiples of the cycle duration $t_C$ of the interrupt I(8'), namely 100.000 µs—that is, 100 times 1000 µs—are calculated and used to determine the interrupt offset $\Delta t_C$. In the present invention, this integer multiple of the cycle duration $t_C$ is also calculated as a time fraction $\Delta t_I$ of the time offset $\Delta t$. The interrupt offset $\Delta t_C$ is the difference between the time fraction $\Delta t_I$ and the time offset $\Delta t$. According to the invention, the interrupt offset $\Delta t_C$ is adapted after the time jump TJ at a number N of trigger points in time $t_{I+n}$ following the time jump TJ. The remaining interrupt offset $\Delta t_C$ can also be re-determined after each subsequent trigger point in time $t_{I+n}$. In the case of a plurality of interrupts I in the interrupt-capable network component 8', 8", which are used as slave 3, these corrections of the trigger points in time $t_{I+n}$ can be determined for each individual interrupt I.

To calculate the time fraction $\Delta t_I$ and the interrupt offset $\Delta t_C$, the time offset $\Delta t$ with respect to the master 2 and the cycle duration $t_C$ of the interrupt I can be used, both of which are known:

In the example above, the determined time offset $\Delta t$ is 100,300 µs, i.e., the difference between the slave time $t_S$ and the master time $t_M$ at the point in time S(D3), the interrupt offset $\Delta t_C$ is 300 µs, and the time fraction $\Delta t_I$ is 100,000 µs. The time offset $\Delta t$ is immediately corrected by the time jump TJ. The predefined deviation dt can, for example, be 10% of the cycle duration $t_C$ of the interrupt I(8'). Consequently, an actual cycle duration $t_{C,R}$ of a 1000 µs long interrupt I(8') can be adapted in the range of 900 µs to 1100 µs. The interrupt offset $\Delta t_C$ could then be corrected at three subsequent trigger points in time $t_{I+n}$ by extending or shortening the respective cycle duration $t_C$ in each case by 100 µS (depending on the sign of the interrupt offset $\Delta t_C$).

In each of the n=1, . . . , N trigger points in time $t_{I+n}$ following the time jump TJ, an actual cycle duration $t_{C,R}$ that arises of the at least one interrupt I(8') deviates from the predefined cycle duration $t_C$ by no more than a predefined deviation dt. The predefined deviation dt is thus limited in order to ensure sufficient equidistance of the interrupt I(8') after the time jump TJ.

The magnitude of the predefined temporal deviation dt can be dependent on the application and the necessary accuracy, and can be predefined or set in the slave 3. For example, the deviation dt can be selected in a preferred range between 0.5 and 5% of the known cycle duration $t_C$ of the interrupt I(8').

The tolerance value g can, for example, be a defined percentage of the known cycle duration $t_C$ of the interrupt I(8'). However, it is also conceivable for the tolerance value G to be a fixed value, for example, such as 10 nanoseconds (ns).

The timer 6 can thus trigger the interrupt I(8') at changed trigger points in time $t_{I+n}$ to ensure shortened or extended actual cycle durations $t_{C,R}$ of the interrupt I(8'). Consequently, a respective interrupt I(8') is triggered at a subsequent trigger point in time $t_{I+}$, before the next shortening/extension can be set.

The interrupt offset $\Delta t_C$ is thus successively corrected at a number n=1, . . . . N of trigger points in time $t_{I+n}$ following the time jump TJ, wherein the predefined cycle duration $t_C$ of the interrupt I(8') is only shortened or extended by an adaptation duration AD. Of course, it is possible that the interrupt offset $\Delta t_C$ that remains after the time jump TJ is so small that an adaptation by using the adaptation duration AD of a single trigger point in time $t_{I+n}$ following the time jump TJ is sufficient for correction.

The above-described manner of correcting the interrupt offset $\Delta t_C$ ensures that a cycle duration $t_C$ of the interrupt I(8') is not temporally shortened or extended too much, which otherwise can lead to the problems described above.

After the time jump TJ, the synchronization unit 5.1 can carry out the adjustment of the interrupt I(8') to the other interrupts I(2), I(8') in the slave 3 by using the number N of trigger points in time $t_{I+n}$ of the interrupt I(8') which follow the time jump TJ using the timer 6.

FIG. 3 shows the adjustment of the interrupts I(2), I(8'), I(8") by way of example. The first trigger point in time $t_{I+1}$ following the time jump TJ is not set to the point in time S(D3), but is, adhering to the cycle duration $t_C$, offset by this cycle duration in relation to the trigger point in time $t_I$ before the time jump TJ. In this exemplary embodiment, the adaptation duration AD for the first trigger point in time $t_{I+1}$ following the time jump TJ was selected to be zero. In FIG. 3, the subsequent trigger points in time $t_{I+n}$, due to the respective selected adaptation duration AD, have actual cycle times $t_{C,R}$ which are shorter than the predefined cycle duration $t_C$ of the interrupt I(8'). At these subsequent trigger points in time $t_{I+n}$, the resulting interrupt offset $\Delta t_C$ is corrected. At these subsequent trigger points in time $t_{I+n}$ of the interrupt I(8'), the actual cycle duration $t_{C,R}$ in each case deviates from the predefined cycle duration $t_C$ of the interrupt I(8') by the predefined deviation dt, and is shortened thereby, for example. The interrupt I(8') thus receives an actual cycle duration $t_{C,R}$ over the subsequent trigger points in time $t_{I+n}$, which, in the example shown in FIG. 3, is shorter, for example, than the predetermined cycle duration $t_C$. The actual cycle duration $t_{C,R}$, however, can also be increased by the predefined deviation dt and can thus be longer than the predefined cycle duration $t_C$ of the interrupt I(8'). The respective subsequent trigger points in time $t_{I+n}$ are carried out by the synchronization unit 5.1, for example in an adaptation unit 9 (FIG. 4) present in the synchronization unit 5.1, adhering to the predefined adaptation duration AD and the restrictions thereof.

Figure 4:
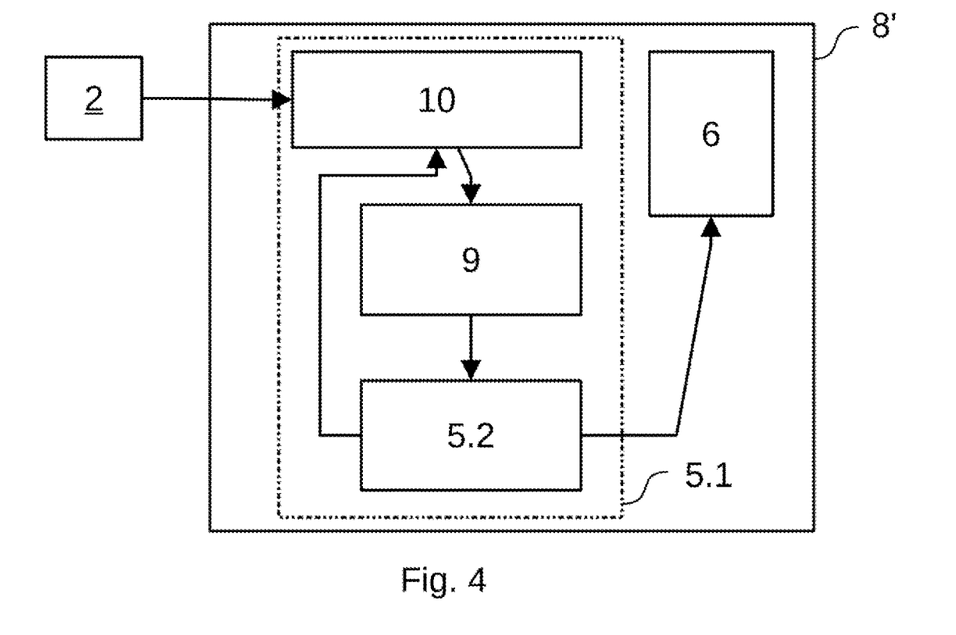
FIG. 4 shows the time synchronization mechanism according to the invention in a network component.

FIG. 4 shows an exemplary embodiment of an interrupt-capable network component 8' serving as a slave 3 with a synchronization unit 5.1 and with a clock 5.2 (other units of the slave 3 are not shown for the sake of simplicity). A time synchronization stack 10, for example a program code, calculates the time offset $\Delta t$ with respect to the master 2 using the synchronization message D or the master time $t_M$ contained therein. The adaptation unit 9 (for example also program code) uses the time offset $\Delta t$ to calculate the time fraction $\Delta t_I$ and to carry out the time synchronization according to the invention and to pass it on to the clock 5.2. The respective current time of the clock 5.2 is then predefined to the timer 6, which can trigger the interrupts I(8') at the respective trigger point in time $t_I$ or at the subsequent trigger points in time $t_{I+n}$.

The adaptation of the interrupts I(8') can take place at a shorter time interval than synchronization messages D arrive at the slave 3.

In FIG. 3, the synchronization unit 5.1 synchronizes, by way of example, in such a way that the interrupt I(8') is adjusted to the remaining interrupts I(2), I(8") by using three subsequent trigger points in time $t_{I+n}$. Thereafter, at the point in time SS all interrupts I(2), I(8'), I(8") continue to run with the predefined cycle duration $t_C$ and are synchronized again. A new synchronization message D has not yet arrived in this case.

According to the invention, the synchronization unit 5.1 (or the timer 6) adapts the interrupts I(8') at the subsequent trigger points in time $t_{I+n}$ over the adaptation duration AD, so that the actual cycle duration $t_{C,R}$ deviates from the cycle duration $t_C$ by no more than the predefined deviation dt.

For illustration, the following table shows an exemplary progression of synchronization messages D and the time offsets $\Delta t$ of the slave time $t_S$. In the following example, the synchronization messages D are continuously denoted by D0 to D2 for the sake of simplicity. Only when the synchronization message D is received is the time fraction $\Delta t_I$ recalculated in this example and the subsequent trigger points in time $t_{I+n}$ of the interrupt I reestablished. This is carried out until the interrupts have been adjusted again (within the predefined tolerance value G). The interrupt offset $\Delta t_C$ is calculated when the synchronization message D is received, as is shown further below in the table. The synchronization of the slave time $t_S$ with the master time $t_M$, i.e., the correction of the time offset $\Delta t$, however, advantageously already takes place when the synchronization message D is received (using a time jump TJ).

In this example, the slave 3 loses the synchronization with the master 2 before the synchronization message D0, for example for reasons described above. At the point in time of the synchronization message D0, the slave 3 has a time offset $\Delta t$ of 100,300 μs. The synchronization unit 5.1 calculates the time offset $\Delta t$ based on the received master time $t_M$ and first carries out the at least one time jump TJ according to the invention. As mentioned, the at least one time jump TJ does not necessarily have to take place in a single step, but can also take place in several steps. At the point in time of the synchronization message D0, the time jump TJ is carried out, and the remaining interrupt offset $\Delta t_C$ thereafter is 300 μs. Between the synchronization messages D0 and D1, the synchronization unit 5.1 carries out multiple adaptations of the number N of trigger points in time $t_{I+n}$ over the adaptation duration AD, wherein the successive trigger points in time $t_{I+n}$ of the interrupt I are temporally offset. Prior to the synchronization message D1, the interrupt offset $\Delta t_C$ identified with the synchronization message D0 is corrected, and the trigger point in time $t_I$ can be triggered again as scheduled. For example, before the loss of the time synchronization, the interrupt I was triggered in the interrupt-capable network component 8' (slave) every 1000 μs, and thus had a cycle duration $t_C$ of 1000 μs. The trigger point in time $t_M$ t of the interrupt I following the time jump JP can be adapted over the adaptation duration AD. The interrupt I can be triggered, for example, every 900 μS, and the actual cycle time $t_{C,R}$ of the interrupt I thus also changes. With this, the maximum deviation dt is also utilized and adhered to. It goes without saying, of course, that, at negative time shifts, the trigger point in time $t_{I+1}$ of the interrupt I following the time jump JP can also result in higher actual cycle times $t_{C,R}$, such as, for example, 1050 μs. The function according to the invention is described in the table with the interrupt offset $\Delta t_C$ and the adaptation duration AD.

Deviations can occur at a very wide variety of points in time due to changes in frequency and changes in the absolute time and cause the clocks 5.2 in the master 2 and in the slave 3 to diverge. Consequently, despite intermediate synchronization in the case of a new synchronization message D1, a new time offset $\Delta t$ can be established. This offset is 450 μs, by way of example, in Table 1 with the synchronization message D1.

Now, the synchronization according to the invention proceeds as with the synchronization message D0, with a time jump TJ and the subsequent correction of the interrupt offset $\Delta t_C$. In the process, the maximum deviation dt in the adaptation duration AD is not always utilized, but the adaptation duration AD is only 50 μS in the last step.

| Time | Synchronization | $t_C$ [μs] | remaining interrupt offset $\Delta t_C$ [μs] | Time fraction $\Delta t_I$ [μs] | Adaptation duration AD [μS] |
|---|---|---|---|---|---|
| D0 | $t_I$ | 1000 | 300 | 100000 | 0 |
|  | $t_{I+1}$ | 900 | 300 | 0 | 100 |
|  | $t_{I+2}$ | 900 | 200 | 0 | 100 |
|  | $t_{I+3}$ | 900 | 100 | 0 | 100 |
|  | $t_I$ | 1000 | 0 | 0 | 0 |
| D1 | $t_I$ | 1000 | 450 | 1000 | 0 |
|  | $t_{I+1}$ | 900 | 450 | 0 | 100 |
|  | $t_{I+21}$ | 900 | 350 | 0 | 100 |
|  | $t_{I+3}$ | 900 | 250 | 0 | 100 |
|  | $t_{I+4}$ | 900 | 150 | 0 | 100 |
|  | $t_{I+5}$ | 950 | 50 | 0 | 50 |
| D2 | $t_I$ | 1000 | 0 | 0 | 0 |

In an advantageous embodiment, the cycle duration $t_C$ of not just a single interrupt I(8') in an interrupt-capable network component 8' is considered in the time synchronization, but also a plurality of cycle durations of interrupts I. For example, a timer 6 can generate a first interrupt I1 having a first cycle duration $t_C$, and a second interrupt I2 having a second cycle duration $t_{C,2}$ in the interrupt-capable network component 8'. Likewise, several timers 6 can also be provided. It may then be necessary to apply the method according to the invention separately to every interrupt I1, I2.

It is also conceivable for two or also several networks to be connected to one another, which have at least one master and at least one slave. Each network can run autonomously and can carry out a time synchronization, as described above. However, there may also be applications or situations in which a network has to be synchronized in terms of time with another network. This can be necessary, for example, when booting a system with multiple networks connected to one another. The networks can start independently of one another, and each network can first internally carry out a described time synchronization. A network can thereafter be synchronized with a further network. It is also conceivable for a network to be connected to a further network. This can take place, for example, when a component (such as a machine, for example) is added to a system that has a network. The time synchronization described above can also be used in such situations.

Figure 5:
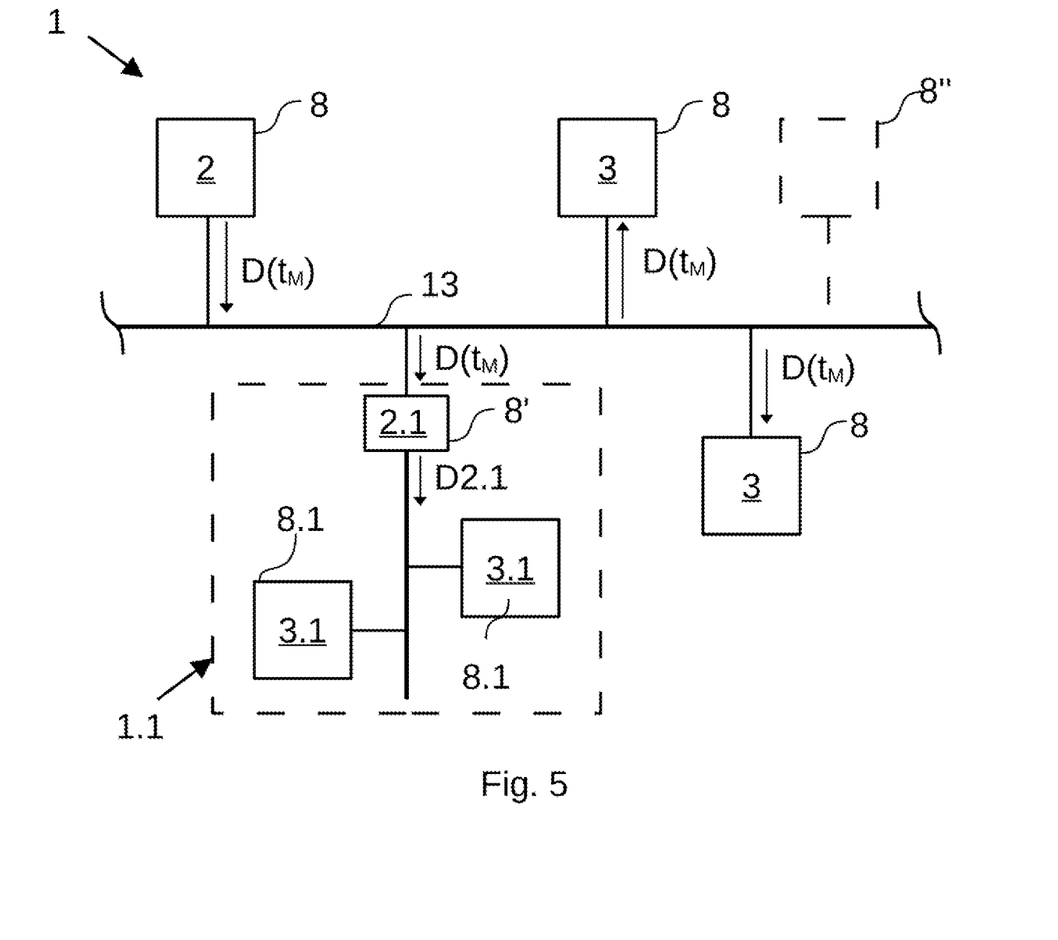
FIG. 5 shows a network with a master and slaves and a hierarchically subordinate network.

It is assumed in the process that a network 1, as shown in FIG. 5, has a master 2 and at least one slave 3 (interrupt-capable network component 8, 8', 8"). A further network 1.1 likewise has a further master 2.1 and at least one slave 3.1. Within each network 1, 1.1, the time synchronization takes place, as described above, using synchronization messages D, D2.1 of the respective master 2, 2.1. In order to synchronize the networks 1, 1.1 with one another, the further master 2.1 of the further network 1.1 acts as a slave of the network 1. This further master 2.1 is connected to the network 1 for this purpose, as shown in FIG. 5. The further master 2.1 acting as a slave of the network 1 is thus synchronized in terms of time via synchronization messages D from the master 2 of the network 1, as described above. Thus, the further master 2.1 can now synchronize the slaves 3.1 in its own, further network 1.1 using the synchronization message D2.1.

For this purpose, it is advantageous if a network hierarchy is established, which predefines which network 1, 1.1 operates, for the time synchronization, as a further or subordinate network 1.1 synchronizing with the network 1, which acts as a superordinate network 1 with respect to the time synchronization.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for the time synchronization between at least one master and at least one slave in a network,
wherein the at least one master predefines a master time and sends at least one synchronization message with the master time via the network to the at least one slave,
wherein the at least one slave, on which a slave time is running, uses the synchronization message to adjust the slave time to the master time using synchronization, and
wherein the at least one slave is an interrupt-capable network device of the network and uses a timer, which accesses the slave time to generate at least one interrupt, which is repeated at a predefined cycle duration, at a respective trigger point in time that is synchronized with the slave time,
wherein, when a synchronization message arrives, a time offset between the master time and the slave time is determined in the slave,
wherein a time fraction of the time offset is determined, the time fraction corresponding to an integer multiple of the predefined cycle duration of the at least one interrupt,
wherein an interrupt offset is determined from the time fraction and the time offset;
wherein at least one time jump is carried out by a synchronization unit in the slave to correct the time offset;
wherein a first trigger point in time of the at least one interrupt following the at least one time jump is set in such a way that the first trigger point in time following the at least one time jump is offset by the predefined cycle duration in relation to the last trigger point in time prior to the at least one time jump;
and wherein a number of trigger points in time of the at least one interrupt which follow the at least one time jump is temporally shifted by an adaptation duration, the adaptation duration for each trigger point in time of the number of the trigger points in time following the at least one time jump being selected from a time range in such a way that the adaptation duration corresponds at most to the interrupt offset and at most to a predefined temporal deviation, and that the sum of all adaptation durations for the number of the trigger points in time following the at least one time jump corresponds to the interrupt offset, taking a predefined tolerance value into consideration.

2. The method according to claim 1, wherein the interrupt-capable network component is configured as a further network with a further master, wherein the at least one master of the network predefines the master time to the further master of the further network.

3. A network comprised of a plurality of network components, wherein, with respect to a time synchronization, at least one network component is a master with a master time and at least one further network component is a slave with a slave time,
- wherein the master is designed to send at least one synchronization message to the slave, and the slave is designed to adjust the slave time to the master time using synchronization, and
- wherein at least one network component is an interrupt-capable network component, which has a timer to access the slave time in order to generate at least one interrupt, which recurs at predefined cycle durations, at a respective trigger point in time that is synchronized with the slave time,
- wherein the interrupt-capable network component has a synchronization unit, which is designed to carry out:
  - determining a time offset between the master time and the slave time when a synchronization message arrives;
  - determining a time fraction of the time offset, the time fraction corresponding to an integer multiple of the predefined cycle duration of the at least one interrupt;
  - determining an interrupt offset from the time fraction and the time offset;
  - carrying out at least one time jump to correct the time offset between the master time and the slave time;
  - setting a first trigger point in time for the at least one interrupt which follows the at least one time jump in such a way that the first trigger point in time following the at least one time jump is offset by the predefined cycle duration in relation to the last trigger point in time prior to the at least one time jump; and
- temporally shifting a number of trigger points in time of the at least one interrupt which follow the at least one time jump by an adaptation duration, wherein the adaptation duration for each trigger point in time of the number of trigger points in time following the at least one time jump is selected from a time range in such a way that the adaptation duration corresponds at most to the interrupt offset and at most to a predefined temporal deviation, and that a sum of all adaptation durations for the number of trigger points in time following the at least one time jump corresponds to the interrupt offset, taking a predefined tolerance value into consideration.

4. The network according to claim 3, wherein the at least one interrupt-capable network component is configured as a further network with a further master, wherein the at least one master of the network is designed to predefine the master time to the further master of the further network.

* * * * *